United States Patent
Wilkes et al.

(10) Patent No.: US 12,181,912 B2
(45) Date of Patent: Dec. 31, 2024

(54) CIRCUIT WITH LOAD JUMP MITIGATION

(71) Applicant: Infineon Technologies AG, Neubiberg (DE)

(72) Inventors: Dyson Wilkes, Marlborough (GB); Miqdad Haji, Bristol (GB); Mark Selby, Gloucester (GB); Neil Stuart Hastie, Lydney (GB)

(73) Assignee: Infineon Technologies AG, Neubiberg (DE)

( * ) Notice: Subject to any disclaimer, the term of this patent is extended or adjusted under 35 U.S.C. 154(b) by 41 days.

(21) Appl. No.: 18/318,038

(22) Filed: May 16, 2023

(65) Prior Publication Data

US 2024/0385640 A1 Nov. 21, 2024

(51) Int. Cl.
  *G06F 1/08* (2006.01)
  *G06F 1/28* (2006.01)

(52) U.S. Cl.
  CPC . *G06F 1/08* (2013.01); *G06F 1/28* (2013.01)

(58) Field of Classification Search
  CPC .................................. G06F 1/08; G06F 1/28
  See application file for complete search history.

(56) References Cited

U.S. PATENT DOCUMENTS

| | | | | |
|---|---|---|---|---|
| 6,065,126 A | * | 5/2000 | Tran | G06F 1/10 713/401 |
| 6,393,579 B1 | * | 5/2002 | Piazza | G06F 9/3867 712/E9.063 |
| 6,609,209 B1 | * | 8/2003 | Tiwari | G06F 1/3228 713/322 |
| 2004/0044915 A1 | * | 3/2004 | Bose | G06F 1/04 712/E9.055 |

* cited by examiner

*Primary Examiner* — Stefan Stoynov
(74) *Attorney, Agent, or Firm* — Banner & Witcoff Ltd.

(57) ABSTRACT

A circuit having load jump mitigation, including: circuit processing stages arranged in a pipeline configuration and operable based on respective stage clock signals; and clock control circuits respectively connected to the circuit processing stages to control the respective stage clock signals. Each of the clock control circuits is operable to: enable the respective stage clock signal in response to receiving a data in signal representing that the respective circuit processing stage begins to receive valid data for processing; disable the respective stage clock signal based on a predetermined respective circuit processing stage processing delay having elapsed since the respective circuit processing stage received any valid data; and enable a next of the clock control circuits, which is connected to a next of the circuit processing stages, based on the predetermined respective circuit processing stage processing delay having elapsed since the respective stage clock signal was enabled, indicating that the respective circuit processing stage is beginning to send the processed valid data to the next circuit processing stage.

20 Claims, 7 Drawing Sheets

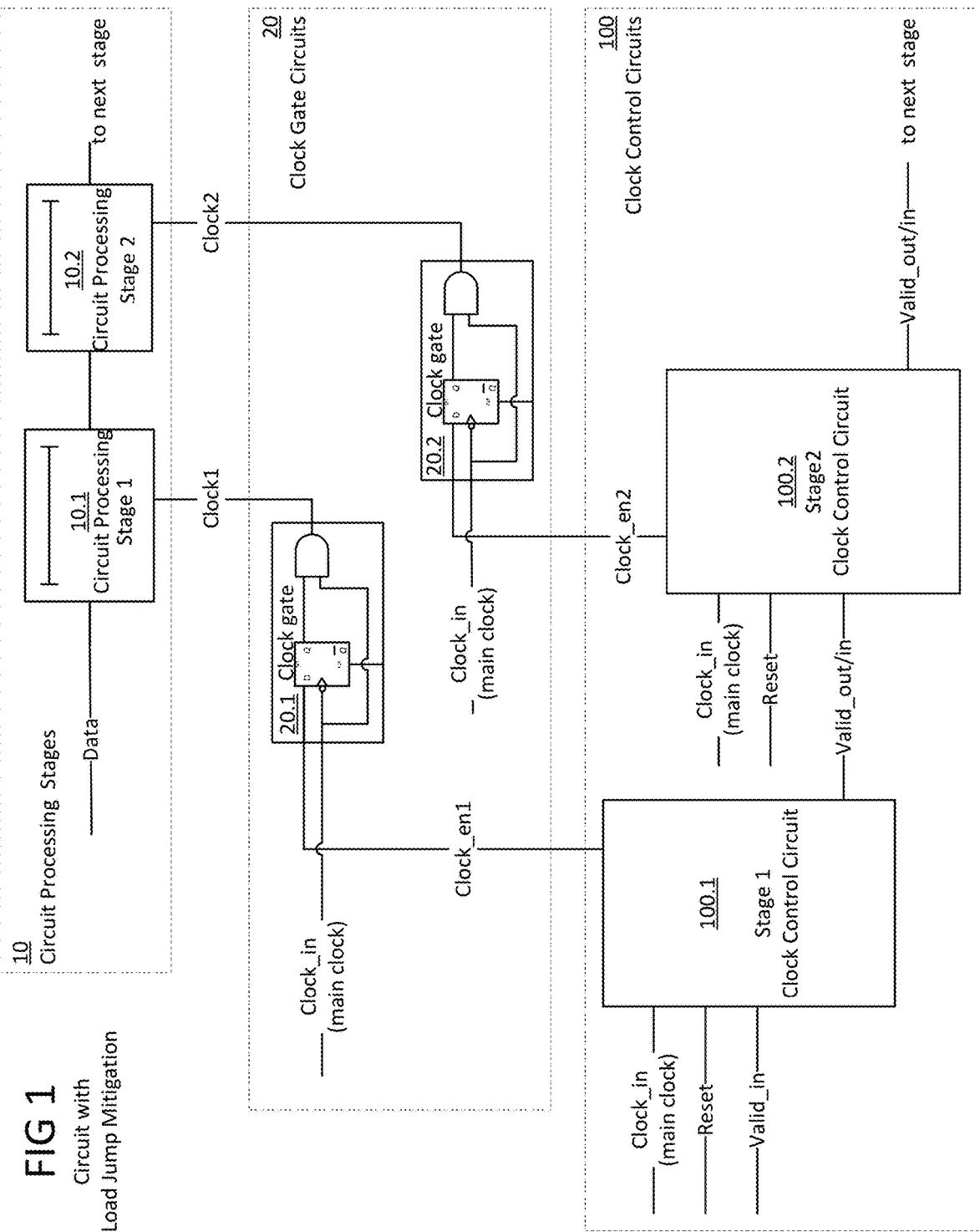

200B
Timing Diagram for
Stage Clock Control Circuit
with Clock Cycle Counter

CIRCUIT WITH LOAD JUMP MITIGATION

BACKGROUND

The Fast Fourier Transform (FFT) is an algorithm used to compute a Discrete Fourier Transform (DFT) of a sequence of samples of a function. The FFT algorithm is divided into stages, referred to as decimation in time (DIT) or decimation in frequency (DIF). Additionally, the processing delays for each stage become smaller for DIF or larger for DIT. In parallel streaming FFT, hardware is used for each stage, while in non-parallel non-streaming FFT, a single hardware unit is used for all stages and memory is shared.

When a global clock is enabled to start processing in a parallel streaming FFT accelerator, there may be a load jump or a significant increase in current consumption. Without mitigation, the load jump may cause a voltage drop, leading to malfunction. However, turning off the clock may result in overvoltage and circuit damage. Thus, it is imperative to reinforce the power supply network to prevent voltage fluctuations and ensure the proper functioning of the FFT accelerator.

BRIEF DESCRIPTION OF THE FIGURES

FIG. 1 illustrates a schematic diagram of a circuit with load jump mitigation, in accordance with aspects of the disclosure.

DETAILED DESCRIPTION

Figure 2A:
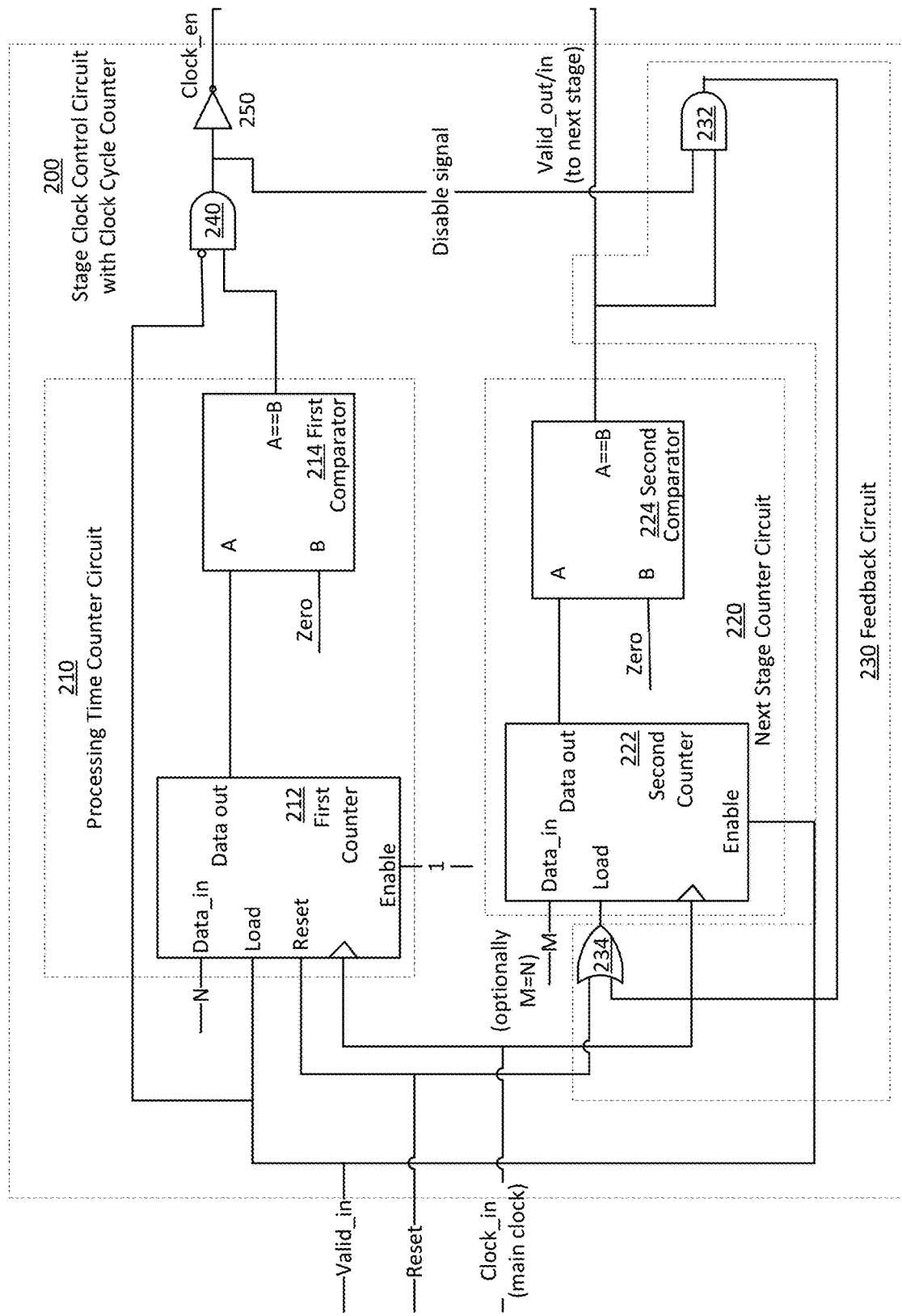
FIG. 2A is a schematic diagram of a stage clock control circuit with a clock cycle counter, in accordance with aspects of the disclosure.

The load jump in a circuit, such as a parallel streaming Fast Fourier Transform (FFT) accelerator, can be mitigated by sequencing the clock to each circuit processing stage of the circuit. The circuit processing stages form a pipeline, which begins to fill and perform useful processing when the FFT accelerator is started. If a circuit processing stage is not performing useful processing, it does not need to be clocked. The disclosed approach controls the sequencing of the clock enables to each circuit processing stage to gradually increase power consumption, rather than all at once in a single clock cycle, thereby reducing load jumps. Similarly, the power can be gradually decreased by a reverse process.

FIG. 1 illustrates a schematic diagram of a circuit with load jump mitigation, in accordance with aspects of the disclosure. This circuit may be comprised within a signal processing unit (SPU), for example.

The circuit comprises circuit processing stages 10, clock gate circuits 20, and clock control circuits 100. Many of the circuit elements are synchronized with a main clock signal (Clock_in).

The circuit processing stages 10 (10.1, 10.2 . . . ) are arranged in a pipeline configuration and operate based on their respective stage clock signals clock #(clock1, clock2 . . . ). Although the pipelined circuit stages 10 may be those of an FFT accelerator, for example, they are not restricted to this application; other processing engines, especially operating on streaming data, could also benefit from the load-jump mitigation techniques disclosed herein. The number of circuit processing stages 10 depends on the specific operation being executed, such as the size of an FFT.

Each of the circuit processing stages 10 may have the same processing time (delay), or alternatively, have distinct processing times, as in the case with an FFT accelerator where a power ramp increases exponentially across stages. Processing circuits with circuit processing stages 10 with equivalent processing times will result in a linear power ramp.

Each circuit processing stage 10 signals to a next circuit processing stage 10 in the pipeline when it has valid data for the next circuit processing stage 10 to process. The data in signal (Valid_in) is utilized to indicate receipt of valid data at the current circuit processing stage 10, and to enable the clock (and/or power) of the subsequent circuit processing stage 10.

The clock gate circuits 20 are connected between the clock control circuits 100 and the circuit processing stages 10, and are operable to start/stop the respective stage clock signal (clock #) based on a circuit processing stage gate clock enable signal (clock_en #). These clock gate circuits 20, which have a negative edge flip-flop coupled to an AND gate in this example, ensure that the stage clock signals (Clock #) are only enabled between active, rising, clock edges.

Each stage clock control circuit 100 (100.1, 100.2 . . . ) receives a data in signal (Valid_in), a reset signal, and a main clock signal (Clock_in). The stage clock control circuits 100 are substantially identical to each other, though the disclosure is not necessarily limited in this respect.

Upon receiving data in signal (Valid_in) indicating that the respective circuit processing stage 10 has started to receive valid data (Data) for processing, each stage clock control circuit 100 can enable the respective stage clock signal (Clock). The stage clock control circuits 100 output a clock enable signal (Clock_en) to the respective circuit processing stage 10 via a respective clock gate circuit 20.

In addition, each stage clock control circuit 100 is operable to disable the respective stage clock signal (Clock) once a first predetermined circuit stage processing delay (N) has elapsed since the respective circuit stage 10 last received valid data (Data), as indicated by the data in signal (Valid_in).

In addition, the stage clock control circuits 100 output a data out signal (Valid_out), which is used as the data in signal (Data_in) for the following stage clock control circuit 100. More specifically, each stage clock control circuit 100 can enable a next of the stage clock control circuit 100, which is coupled to a next of the circuit stages 10, after a second predetermined respective circuit stage processing delay (M) has elapsed since enabling the respective stage clock signal (Clock). This delay M indicates that the respective circuit stage 10 has started transmitting processed valid data to the next circuit processing stage 10. Optionally, M can be set equal to N.

Figure 2B:
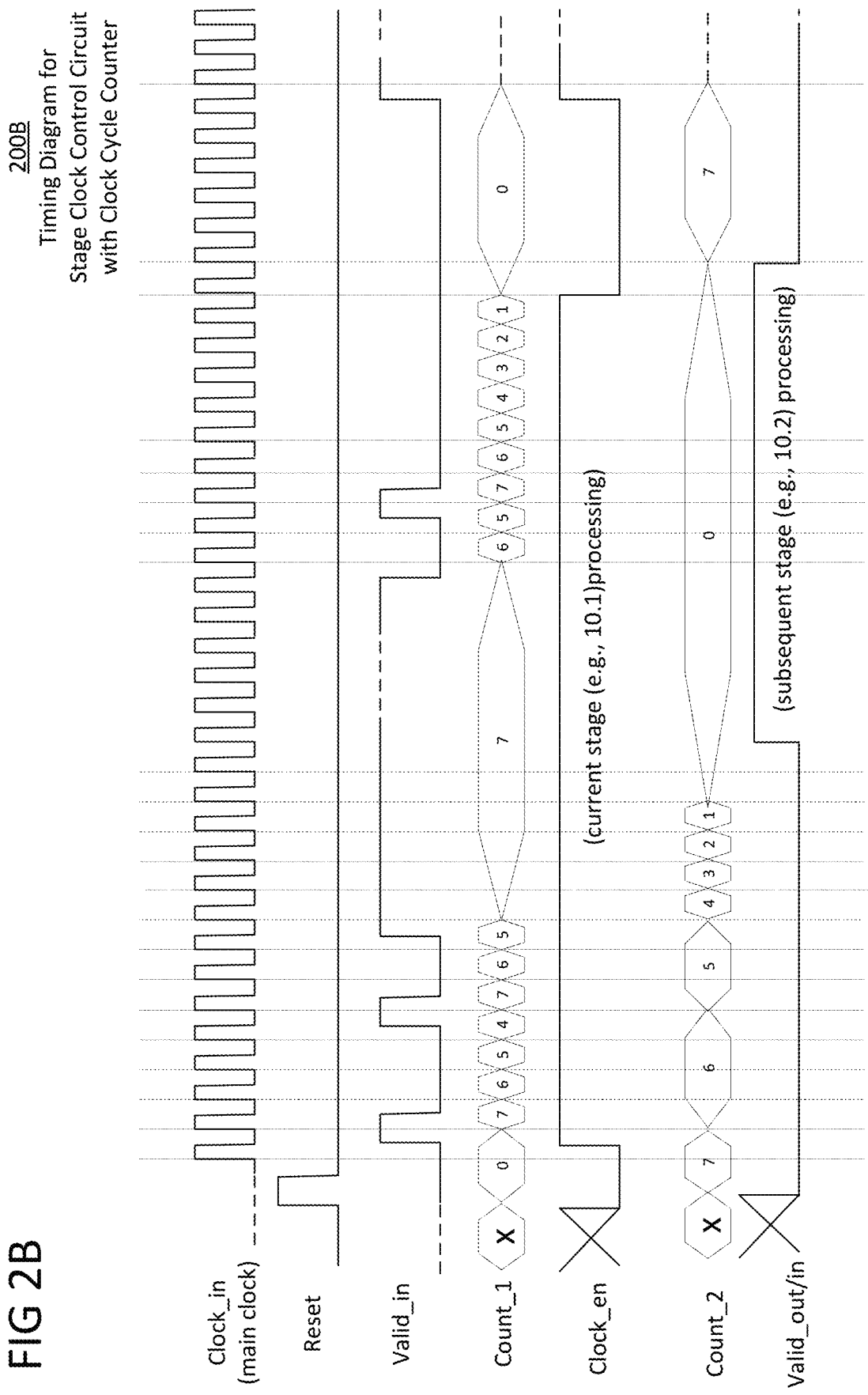
FIG. 2B is a timing diagram of the stage clock control circuit with the clock cycle counter of FIG. 2A.

FIGS. 2A and 2B illustrate a stage clock control circuit 200 with a clock cycle counter, illustrates a corresponding timing diagram 200B, in accordance with aspects of the disclosure. The stage clock control circuit counter 200 is an example of any of the clock control circuits 100 of FIG. 1.

The stage clock control circuit 200 comprises a processing time counter circuit 210, a next stage counter circuit 220, a feedback circuit 230, an AND gate 240, and an inverter 250.

The processing time counter circuit 210 enables and disables a respective stage clock signal (clock #) to be active when the respective circuit processing stage 10 is processing data. Specifically, the processing time counter circuit 210 counts the time for the circuit processing stage 10 to process N cycles of received data. Once the circuit processing stage 10 has finished processing N clock cycles worth of data, the clock enable signal (Clock_en) output from the processing time counter circuit 210 becomes valid, that is, high in this example. The circuit processing stage 10 still continues processing until the pending processing on the received data has been completed, which in this case is N clocks cycles. Following the receipt of the last data, it will take the processing time for the data to complete the processing stage circuit 10. At this point, the processing time counter circuit 210 can render the clock enable signal (Clock_en) invalid, deactivating the stage clock signal (clock #) since the circuit processing stage 10 has completed processing.

To be more specific, the processing time counter circuit 210 generates a circuit stage gate clock enable signal (clock_en) when it receives a data in signal (Valid_in), which enables the respective stage clock signal (clock #). The data in signal (Valid_in) indicates that the respective circuit processing stage 10 has received valid data for processing. Based on a first predetermined respective circuit processing stage processing delay of N clock cycles since the respective circuit processing stage 10 has last received valid data, the processing time counter circuit 210 disables the respective stage clock signal (clock #). The processing time counter circuit 210 ensures that the current circuit processing stage 10 remains activated until the last of the set of received data has been processed and emerges at its output.

The occurrence of a pulse of the data in signal (Valid_in), which indicates the receipt of data, may occur sporadically. If the circuit processing stage 10 is not receiving data at a steady rate, the data in signal (Valid_in) will go low, and valid data will not be counted during this phase, but the stage clock signal will remain enabled. The clock enable signal (Clock_en) will stay high until the processing time counter circuit 210 reaches zero, indicating that the circuit processing stage 10 has finished processing the data.

The processing time counter circuit 210 comprises a first counter 212 and a first comparator 214, wherein the first counter 212 is loaded with predetermined constant value N). The first counter 212's count (Count_1) is reset to zero during reset operations. The processing time counter circuit 210 counts a first predetermined number of clock cycles N, which corresponds to the processing time of the respective circuit processing stage 10. For each clock cycle where the data in signal (Valid_in) is received by the respective clock control circuit 200, indicating that the respective circuit processing stage 10 has valid data for processing, the processing time counter circuit 210 reloads a count N of the first predetermined number clock cycles. Once the first comparator 214 determines that the first predetermined number of clock cycles N has been counted since a last reload, the processing time counter circuit 210 disables the respective stage clock signal (Clock #) via the AND gate 240 and inverter 250.

The AND gate 240 receives an inverted data in signal (Valid_in) and the output of the first comparator 214 as inputs and produces a disable signal as output. The inverter 250 takes the disable signal as input and outputs an inverted version of the disable signal as the clock enable signal (Clock_en).

The next stage counter circuit 220 introduces a delay in the enabling of the stage clock signal of the subsequent circuit processing stage 10 (e.g., 10.2), which is connected to a subsequent stage clock control circuit 200. Specifically, the next stage counter circuit 220 delays the output of the data out signal (Valid_out), indicating that a subsequent circuit processing stage (e.g., 10.2) is not enabled until the current circuit processing stage (e.g., 10.1) has completed processing its data and has output processed data for the subsequent circuit processing stage (e.g., 10.2) to process. The next stage counter circuit 220 outputs a data out signal (Valid_out) to the subsequent stage clock control circuit 200 (e.g., 200.2) after a second predetermined respective circuit processing stage processing delay (M clock cycles) since enabling the respective stage clock signal (e.g., Clock1), indicating that the respective circuit processing stage (e.g., 10.1) has begun transmitting the processed valid data to the next circuit processing stage (e.g., 10.2). The data out signal (Valid_out) of the current stage clock control circuit (e.g., 200.1) serves as the data in signal (Valid_in) for the subsequent stage clock control circuit (e.g., 200.2).

The next stage counter circuit 220 comprises a second counter 222 and a second comparator 224. It counts a second predetermined number of clock cycles M, corresponding to a processing delay of the respective circuit processing stage 10. The second counter 222 outputs a second count value to a second comparator 224, which then compares the second count value to zero. After counting the second predetermined number clock cycles M following a clock cycle in which the data in signal (Valid_in) that triggers the respective stage clock signal to be enabled is received, the next stage counter circuit 220 outputs a next data in signal (Valid_out/in) to the next of the stage clock control circuits 200. The second predetermined number of clock cycles resets to M, in this case 7, when the data out signal (Valid_out) in this example goes low.

The first counter 212 and second counter 222 in this example are identical down-counter circuits that are loaded with the value on their Data_in input (represented by constant values N and M, respectively) when their load signals are activated. In this example, each of the first and second counters 212 and 222 decrements by one on a rising clock edge when its enable input is activated, but this is merely a design choice.

If the circuit with load jump mitigation is an FFT engine, the second predetermined number of clock cycles M is not equivalent to the first predetermined number of clock cycle N. This is due to the fact that an FFT engine stage requires all of the data before the circuit processing stage completes its processing.

The respective circuit processing stage 10 can be shut down by the feedback circuit 230. Resetting the next stage counter circuit 220 causes the data out signal (Valid_out) to go low when the next stage counter circuit 220 counts down to zero. The feedback circuit 230 is connected between the output and input of the next stage counter circuit 220, and comprises a AND gate 232 and an OR gate 234. The first input of the AND gate 232 is an inverted version of the respective stage clock enable signal (Clock_en) taken upstream of the inverter 250, while the second input is the data out signal (Valid_out). When the stage clock (clock #) is disabled and the next stage counter circuit 220 counts down to zero representing an elapsed processing delay of the respective circuit processing stage 10, the feedback circuit 230 reloads the second predetermined number of clock cycles M in the next stage counter circuit 220 via the OR gate 234.

Figure 3:
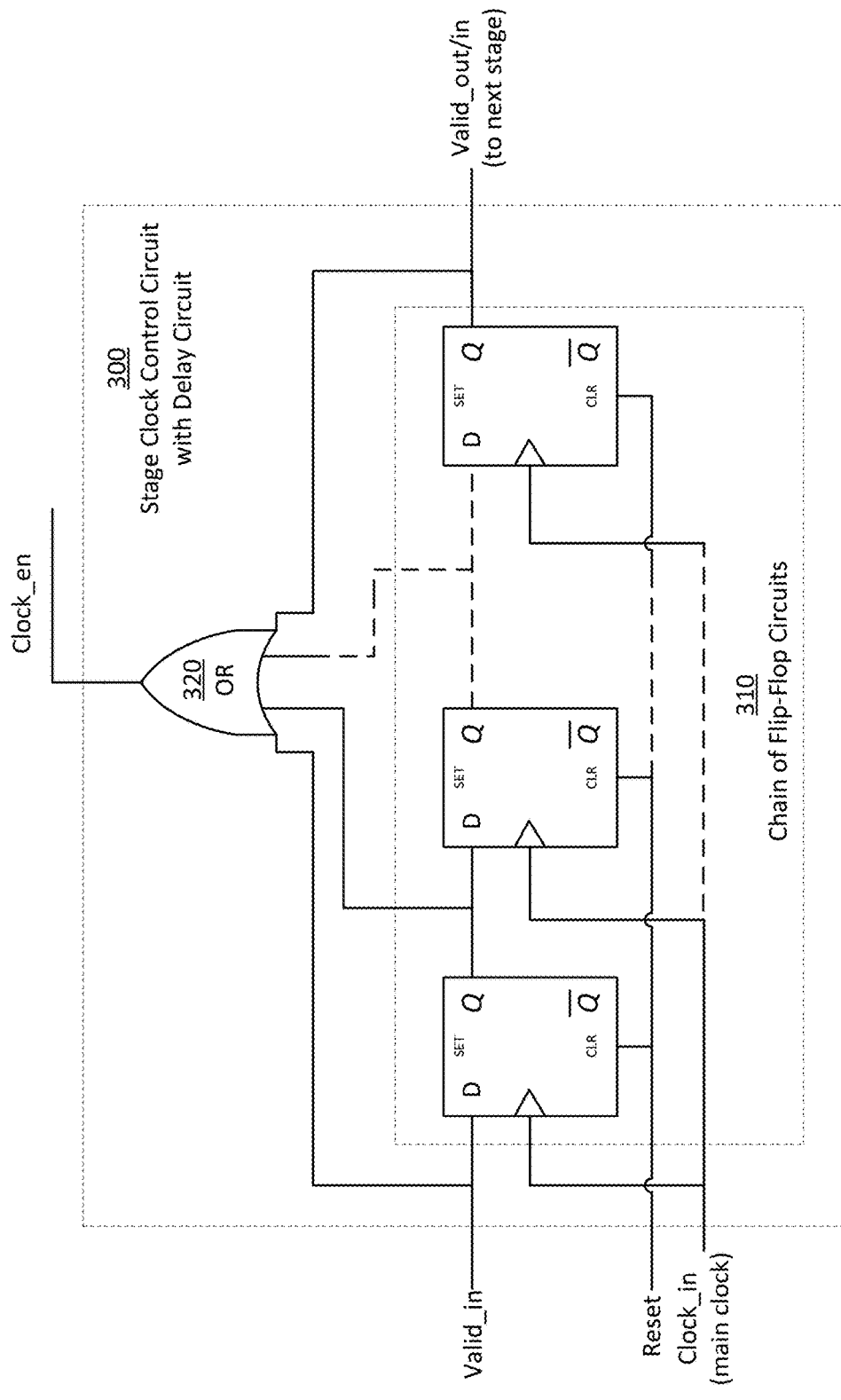
FIG. 3 is a schematic diagram of a stage clock control circuit with a delay circuit, in accordance with aspects of the disclosure.

FIG. 3 illustrates a schematic diagram of a stage clock control circuit 300 with delay circuit, in accordance with aspects of the disclosure.

The stage clock control circuit 300 with delay circuit is an example of any of the stage clock control circuits 100 of FIG. 1, and it introduces a delay in the received data in signal (Valid_in) before sending it to the next stage clock control circuit 300 as a data out signal (Valid_out/in).

The stage clock control circuit 300 with delay circuit comprises a chain of one or more flip-flop circuits 310 and an OR gate 320. The length of the chain of flip-flop circuits 310 corresponds to the processing delay of the corresponding circuit processing stage 10. The dotted lines in the figure indicate that the length of the chain of flip-flop circuits 310 may vary based on the processing delays of the respective circuit processing stages 10. Alternatively, the chain of flip-flop circuits 310 may be substituted with a shift register, for example.

The OR gate 320 is fed by outputs of the chain of flip-flop circuits 310. The stage clock control circuit with delay circuit 300 enables the respective stage clock signal (Clock) based on output signals of the chain of respective flip-flop circuits 310. Each of the flip-flop circuit 310 is connected to a respective input of the OR gate 320.

The data in signal (Valid_in) is transmitted through the chain of flip-flop circuits 310. The OR gate 320 outputs a clock enable signal (Clock_en) when at least one of its inputs is a logic value 1. The chain of flip-flop circuits 310 outputs a delayed version of the data in signal (Valid_in) as a data out signal (Valid_out). Upon resetting the chain of flip-flop circuits 310, both the data out signal (Valid_out) and the clock enable (Clock_en) become zero.

When a circuit processing stage completes its last processing step and receives the final data input, the clock for that stage is stopped. To account for the potential delay resulting from glitch-free clock gating, the cycle timing of a clock enable signal can be advanced. This usually takes one clock cycle, allowing the clock to be enabled without affecting the active edge. T delay is known as "clock gating latency."

The circuit processes data (Data) that carries the data in signal (Valid_in). To account for clock gating latency, one clock cycle of valid data is preempted. Moreover, an extra bit in the data indicates valid data, and clearing these bits can be costly in terms of processing time if memories are utilized for the delays. While this clearing can be performed in the memories as the circuit shuts down, it prevents the current consumption from ramping down. An alternative approach is to substitute the memory bit with a shift register of suitable, with a width of one-bit length. The shift register can be configured to have a "one hot" value, enabling it to clear itself.

Figure 4A:
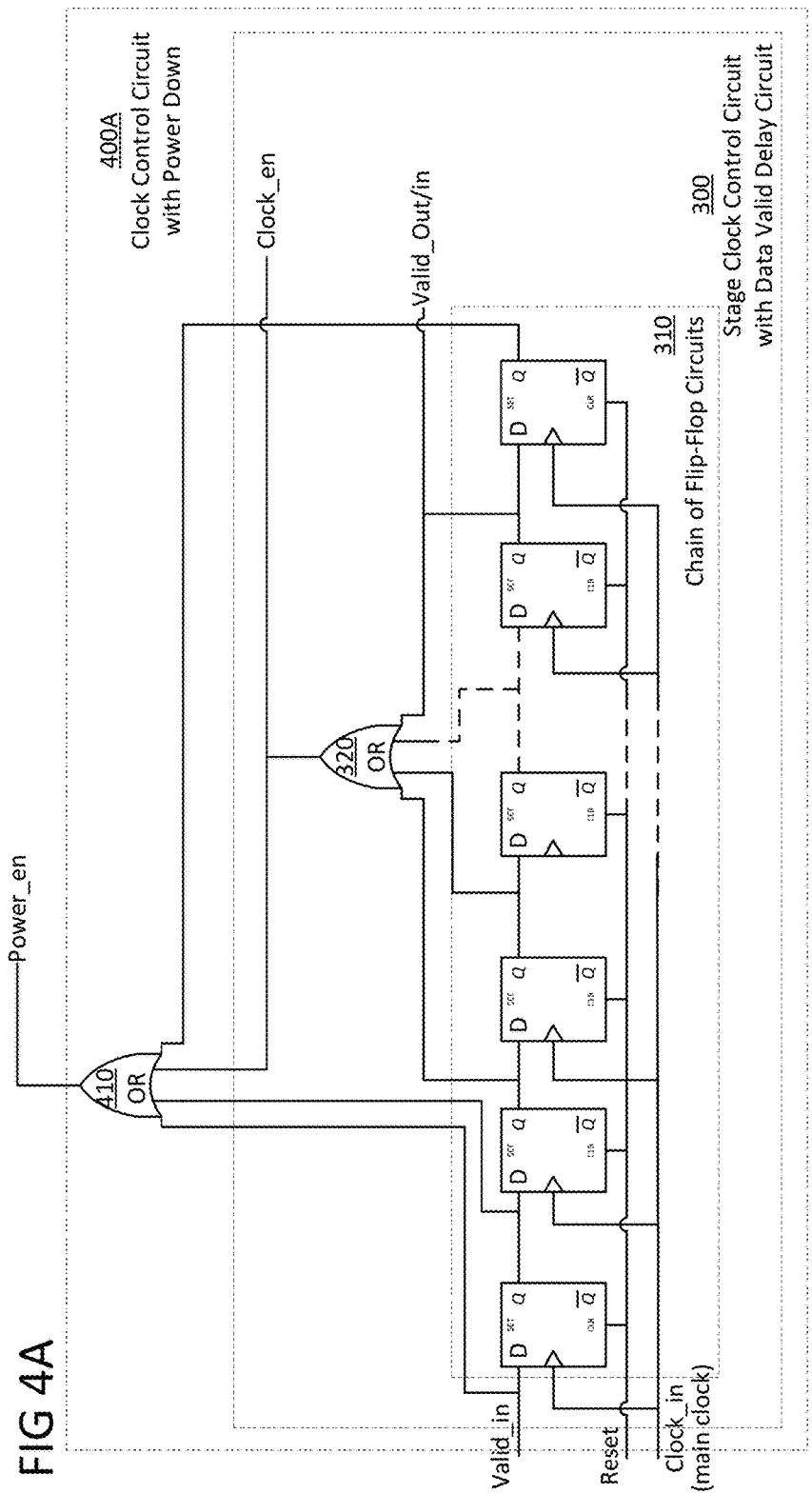
FIG. 4A is a schematic diagram of a stage clock control circuit with power down, in accordance with aspects of the disclosure.
Figure 4B:
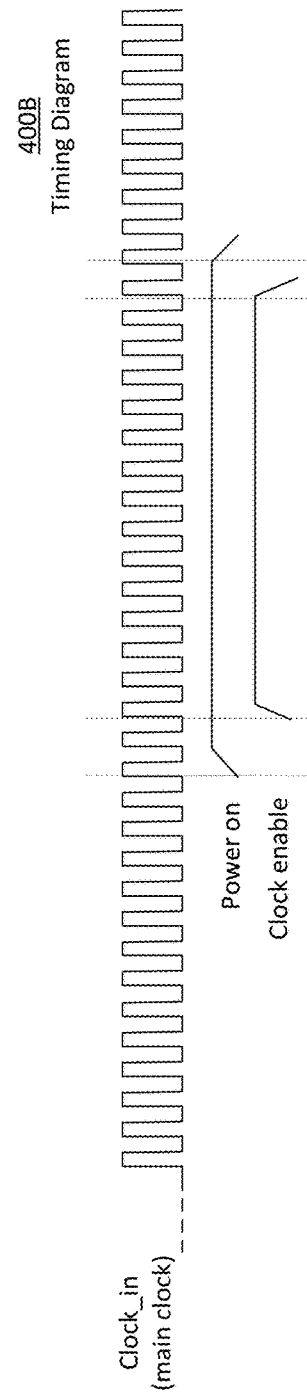
FIG. 4B is a timing diagram of the stage clock control circuit with power down of FIG. 4A, in accordance with aspects of the disclosure.

FIGS. 4A and 4B illustrate a clock control circuit with power down 400A and corresponding timing diagram 400B, in accordance with aspects of the disclosure.

When dealing with larger processing engines with sufficiently large circuit processing stages, it is possible to use separate power domains to turn off the power supply in sequence. This approach helps to reduce load jump resulting from abrupt changes in leakage current.

The clock control circuit with power down 400 comprises the delay circuit 300 of FIG. 3, as well as an OR gate 410 that can switch the power supply to the respective circuit processing stage 10 on and off. This circuit 400 operates similarly to circuit 300, with the first OR gate 320 providing the clock enable signal (Clock_en), which is one of the inputs to the OR gate 410. The output of the power control OR gate 410 is connected to the respective clock control circuit 10 in a manner dictated by design.

The power OR gate 410 is connected between the delay circuit 300 and the respective circuit processing stage 10. It allows power to flow to the respective circuit processing stage 10 when the respective stage clock signal (Clock #) is enabled. The power OR gate 410 enables power to the respective circuit processing stage 10 upon receipt of the data in signal (Valid_in), the clock enable signal (Clock_en), or the final data from the last of the chain of flip-flop circuits 310.

In the timing diagram 400B of FIG. 4B, the interrelationships between the main clock signal (Clock_in), the power enable signal (Power_en), and the clock enable signal (Clock_en) are illustrated. Power is supplied to the circuit processing stage 10 for the duration that the stage clock signal (Clock #) is enabled, and it is turned on with sufficient time for the clock enable signal (Clock_en) to reach a fully powered-up circuit processing stage 10. For example, the power can be turned on one clock cycle before clock enable signal (Clock_en), and remain on until one clock cycle after it is disabled.

More specifically, when the clock control circuit with power down 400 receives the data in signal (Valid_in), the power enable signal (Power_en) turns on at the rising edge of the subsequent clock cycle. The power remains on during the delay period while the respective circuit processing stage 10 receives and processes data, and it turns off after the falling edge of the next clock cycle following the disabling of the clock enable signal (Clock_en).

Figure 5:
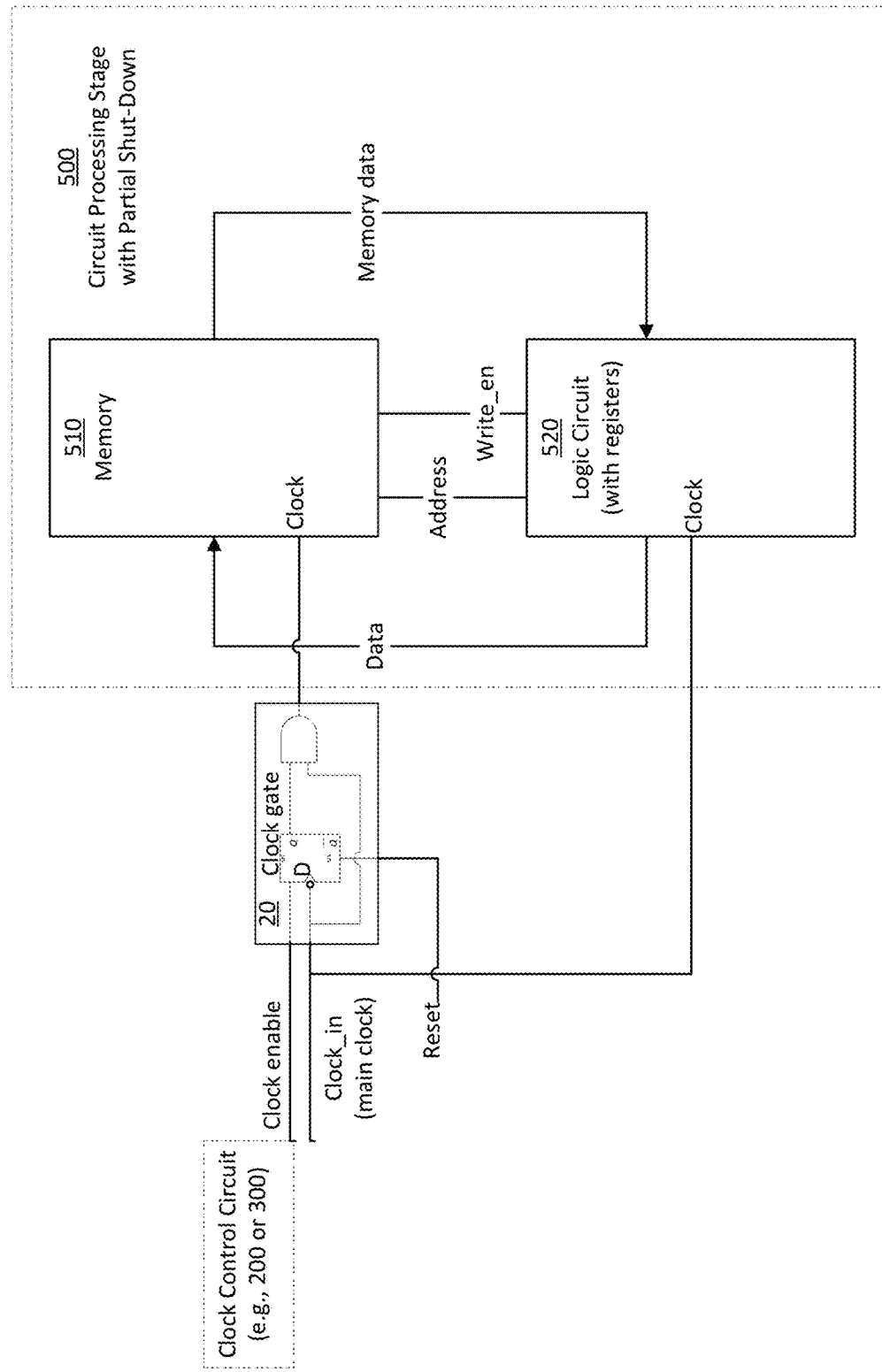
FIG. 5 is a schematic diagram of a circuit processing stage with partial shut-down, in accordance with aspects of the disclosure.

FIG. 5 illustrates a schematic diagram of a circuit processing stage 500 with partial shut-down, in accordance with aspects of the disclosure.

The circuit processing stage 500 comprises a memory 510 and a logic circuit 520 with registers, and is an example of the circuit processing stage 10 of FIG. 1.

Instead of completely disabling the clock signal (Clock) # to the entire circuit processing stage 500, specific portions, such as only the memory 510, only the logic circuit 520, or only a portion of the logic circuit 520, may have their clock signals (Clock) disabled. This partial shutdown helps reduce power consumption in a circuit processing stage 10 without completely cutting off the power, which can cause high load jump and have negative effects.

In situations where the streaming data source is non-continuous, and there are intervals during which no valid data is input, the circuit processing stages 10 can be turned off in sequence as the pipeline drains the data. Once input becomes available again, the circuit processing stages 10 can be turned on again in sequence. This mechanism can be used to "stall" processing when the circuit cannot accept data for any reason, such as contention for a shared system memory.

In this example, the clock control circuit (e.g., 200 of FIG. 2A or 300 of FIG. 3) enables and disables the respective stage clock signal (Clock #) to the memory 510, and a clock gate circuit 20 is connected between the clock control circuit (e.g., 200 or 300) and the memory 510. Alternatively, the clock control circuit (e.g., 200 or 300) can enable and disable the respective stage clock signal (Clock #) to at least a portion of the logic circuit 520, and in this case, the clock gate circuit 20 would be coupled between the clock control circuit (e.g., 200 or 300) and the logic circuit 520. The decision on which portion of the circuit processing stage 500 has its stage clock signal disabled is a tradeoff between power reduction and load-jump.

Figure 6:
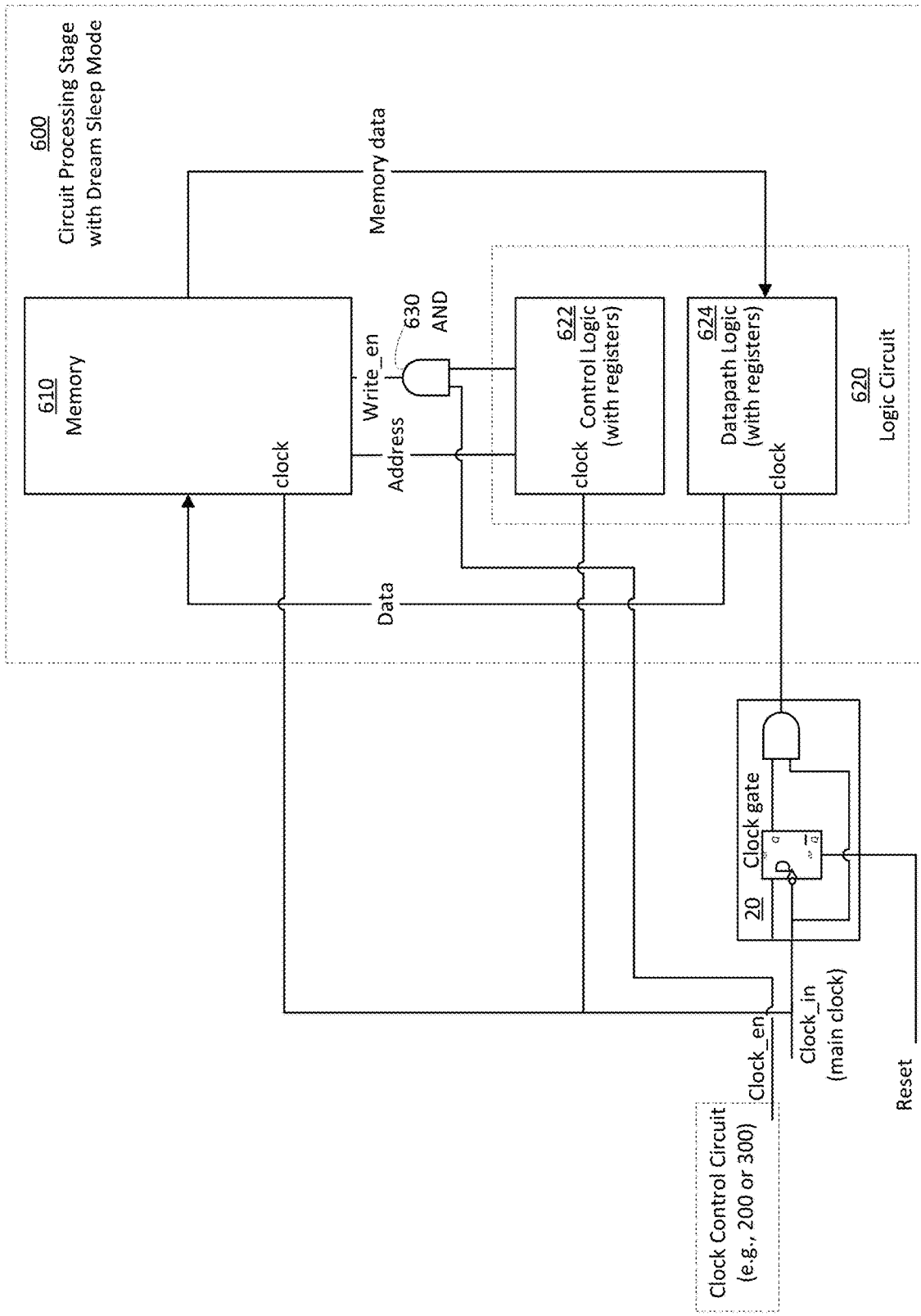
FIG. 6 is a schematic diagram of a circuit processing stage with dream sleep mode, in accordance with aspects of the disclosure.

FIG. 6 illustrates a circuit processing stage 600 with dream sleep mode, in accordance with aspects of the disclosure.

Rather than completely stopping the clock when processing cannot continue, the circuit processing stage 10 can enter a "dream sleep" mode where processing continues, but the data in memory is not modified. This can be accomplished using either the clock control circuit 200 of FIG. 2A or the clock control circuit 300 of FIG. 3. To prevent the data from being written to memory, a "dirty" signal can be added to the "valid" signal. However, pipeline registers, which are temporary storage, can still be loaded.

The circuit processing stage 600 comprises a memory 610, a logic circuit 620, and an AND gate 630. The logic circuit 620 comprises a control logic circuit 622 and a datapath logic circuit 624, which performs arithmetic operations, for example. The circuit processing stage 600 is an example of the circuit processing stage 10 of FIG. 1.

The clock control circuit (e.g., 200 of FIG. 2A or 300 of FIG. 3) can enable and disable the stage clock signal (Clock) to the datapath logic circuit 624 via clock gate 20, while still clocking the memory 610 and the control logic circuit 622. The clock of the data path logic 624 is turned off, whereas the control logic circuit 622 and the memory 610 have their clocks remaining on. The AND gate 630 receives the clock enable signal (Clock_en) and a write enable signal from the control logic circuit 622 as inputs. This AND gate 630 allows the write enable signal (Write_en) to pass from the control logic circuit 622 to the memory 610 when the clock enable signal (Clock_en) is asserted.

By inhibiting the write enable signal (Write_en), the state of the memory 610 is preserved in a dream state, which consumes less power than writing to and reading from the memory 610. The circuit processing stage 600 essentially cycles through memory addresses as it does during regular operation, without writing any data. Once the clock is re-enabled, processing can quickly resume from where it left off.

This aspect of the disclosure is a tradeoff between minimum average power consumption and maximum load jump by disabling the clock to some portions of the circuit processing stage 600. For instance, the clock to data pipeline registers is turned off, but data in the memory continues to be read. If the read addresses are data-dependent, a pseudo-random read pattern can be employed However, if the memory clock and access are halted, then pseudo-random data replaces the actual data.

Optionally, the dream sleep mode of FIG. 600 may be utilized in conjunction with the partial shutdown of FIG. 5 and/or the power down of FIGS. 4A and 4B, and different modes may be used for each of the circuit processing stages 10.

The disclosed aspects may be implemented using various types of circuits, including but not limited to analog circuits, digital circuits, mixed-signal circuits, or programmable circuits. Analog circuits are electronic circuits that operate with continuous signals, such as voltage or current. Digital circuits, on the other hand, operate with discrete signals, typically in the form of binary digits. Mixed-signal circuits combine both analog and digital circuits to process signals that contain both continuous and discrete components. Programmable circuits, such as field-programmable gate arrays (FPGAs) or digital signal processors (DSPs), offer flexibility and reconfigurability in the implementation of the disclosed aspects, allowing the circuit to be programmed or reprogrammed to perform different functions or operations.

A digital pulse signal that switches between a high voltage level and a low voltage level can represent an enable or disable function. The high voltage level typically represents an enable or active state, while the low voltage level typically represents a disable or inactive state. In addition, the pulse signal can be reversed to change the polarity of the signal, such that the high voltage level represents a disable or inactive state, while the low voltage level represents an enable or active state.

The techniques of this disclosure may also be described in the following examples.

Example 1. A circuit having load jump mitigation, the circuit comprising: circuit processing stages arranged in a pipeline configuration and operable based on respective stage clock signals; and clock control circuits respectively connected to the circuit processing stages to control the respective stage clock signals, wherein each of the clock control circuits is operable to: enable the respective stage clock signal in response to receiving a data in signal representing that the respective circuit processing stage begins to receive valid data for processing; disable the respective stage clock signal based on a predetermined respective circuit processing stage processing delay having elapsed since the respective circuit processing stage received any valid data; and enable a next of the clock control circuits, which is connected to a next of the circuit processing stages, based on the predetermined respective circuit processing stage processing delay having elapsed since the respective stage clock signal was enabled, indicating that the respective circuit processing stage is beginning to send the processed valid data to the next circuit processing stage.

Example 2. The circuit of example 1, where at least two of the circuit processing stages have different processing delays.

Example 3. The circuit of any one or more of examples 1-2, wherein each of the clock control circuits is operable to output a circuit processing stage gate clock enable signal, in response to receiving the data in signal representing that the respective circuit processing stage begins to receive valid data for processing, to enable the respective stage clock signal.

Example 4. The circuit of any one or more of examples 1-3, wherein each of the clock control circuits comprises: a processing time counter circuit operable to count a first predetermined number of clock cycles corresponding with a processing time of the respective circuit processing stage.

Example 5. The circuit of any one or more of examples 1-4, wherein the processing time counter circuit is further operable to: for each clock cycle that the respective clock control circuit receives the data in signal representing that the respective circuit processing stage receives valid data for processing, reload a count of the first predetermined number clock cycles; and output the circuit processing stage gate clock enable signal, in response to the processing time counter circuit having counted the first predetermined number clock cycles since a last reload, to disable the respective stage clock signal.

Example 6. The circuit of any one or more of examples 1-5, further comprising: clock gate circuits respectively connected between the clock control circuits and the circuit processing stages, and operable to start/stop the respective circuit processing stage clock signal based on the circuit processing stage gate clock enable signal.

Example 7. The circuit of any one or more of examples 1-6, wherein each of the clock control circuits comprises: a next stage counter circuit operable to count a second predetermined number of clock cycles corresponding with a processing delay of the respective circuit processing stage.

Example 8. The circuit of any one or more of examples 1-7, wherein the next stage counter circuit is further operable to: in response to the respective clock control circuit counting the second predetermined number clock cycles after a clock cycle during which the data in signal that causes the respective stage clock signal to be enabled is received, output a next data in signal to a next of the clock control circuits.

Example 9. The circuit of any one or more of examples 1-8, further comprising: a feedback circuit connected between an output and input of the next stage counter circuit, wherein in response to the respective stage clock signal being enabled and the next data in signal being output, the feedback circuit is operable to reload the second predetermined number of clock cycles of the next stage counter circuit.

Example 10. The circuit of any one or more of examples 1-9, wherein the circuit is a Fast Fourier Transform (FFT) processing circuit.

Example 11. The circuit of any one or more of examples 1-10, wherein each of the clock control circuits comprises: a delay circuit operable to delay the received data in signal from being transmitted to a next of the clock control circuits as a data out signal.

Example 12. The circuit of any one or more of examples 1-11, wherein the delay circuit comprises: a chain of one or more flip-flop circuits; and an OR gate having inputs connected to outputs of the respective flip-flop circuits, and operable to enable the respective stage clock signal based on output signals of the flip-flop circuits.

Example 13. The circuit of any one or more of examples 1-12, wherein each of the clock control circuits comprises: a circuit element connected between the delay circuit and the respective circuit processing stage, and operable to enable power to the respective circuit processing stage while the respective stage clock signal is enabled.

Example 14. The circuit of any one or more of examples 1-13, wherein each of the clock control circuits comprises: a second OR gate operable to enable power to the respective circuit processing stage when the circuit element receives the data in signal, the clock enable signal, or a last of data from a last flip-flip circuit of the chain of one or more flip-flop circuits.

Example 15. The circuit of any one or more of examples 1-14, wherein: the respective circuit processing stages comprise a memory and a logic circuit, and each of the clock control circuits is operable to enable and disable the respective stage clock signal to one of the memory and at least a portion of the logic circuit.

Example 16. The circuit of any one or more of examples 1-15, further comprising a clock gate circuit connected between the clock control circuit and one of the memory and the logic circuit of the respective circuit processing stage.

Example 17. The circuit of any one or more of examples 1-16, wherein: each of the respective circuit processing stages comprises a memory and a logic circuit, and the logic circuit comprises a control logic circuit and a datapath logic circuit, and the respective clock control circuits are operable to enable and disable the respective stage clock signal to the datapath logic circuit, and continue to clock the memory and the control logic circuit.

Example 18. A method for mitigating load jump in a circuit having circuit processing stages arranged in a pipeline configuration and operable based on respective stage clock signals, and clock control circuits respectively connected to the circuit processing stages to control the respective stage clock signals, the method comprising: enabling the respective stage clock signal in response to the respective clock control circuit receiving a data in signal representing that the respective circuit processing stage begins to receive valid data for processing; disabling the respective stage clock signal based on a predetermined respective circuit processing stage processing delay having elapsed since the respective circuit processing stage received any valid data; and enabling a next of the clock control circuits, which is connected to a next of the circuit processing stages, based on the predetermined respective circuit processing stage processing delay having elapsed since the respective stage clock signal was enabled, indicating that the respective circuit processing stage is beginning to send the processed valid data to the next circuit processing stage.

Example 19. The method of example 18, where at least two of the circuit processing stages have different processing delays.

Example 20. The method of any one or more of examples 18-19, further comprising: outputting, by each of the clock control circuits, a circuit processing stage gate clock enable signal, in response to receiving the data in signal representing that the respective circuit processing stage begins to receive valid data for processing, to enable the respective stage clock signal.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A circuit having load jump mitigation, the circuit comprising:
   circuit processing stages arranged in a pipeline configuration and operable based on respective stage clock signals; and
   clock control circuits respectively connected to the circuit processing stages to control the respective stage clock signals, wherein each of the clock control circuits is operable to:
      enable the respective stage clock signal in response to receiving a data in signal representing that the respective circuit processing stage begins to receive valid data for processing;
      disable the respective stage clock signal based on a predetermined respective circuit processing stage processing delay having elapsed since the respective circuit processing stage received any valid data; and
      enable a next of the clock control circuits, which is connected to a next of the circuit processing stages, based on the predetermined respective circuit processing stage processing delay having elapsed since the respective stage clock signal was enabled, indicating that the respective circuit processing stage is beginning to send the processed valid data to the next circuit processing stage.

2. The circuit of claim 1, where at least two of the circuit processing stages have different processing delays.

3. The circuit of claim 1, wherein each of the clock control circuits is operable to output a circuit processing stage gate clock enable signal, in response to receiving the data in signal representing that the respective circuit processing stage begins to receive valid data for processing, to enable the respective stage clock signal.

4. The circuit of claim 3, wherein each of the clock control circuits comprises:
a processing time counter circuit operable to count a first predetermined number of clock cycles corresponding with a processing time of the respective circuit processing stage.

5. The circuit of claim 4, wherein the processing time counter circuit is further operable to:
for each clock cycle that the respective clock control circuit receives the data in signal representing that the respective circuit processing stage receives valid data for processing, reload a count of the first predetermined number of clock cycles; and
output the circuit processing stage gate clock enable signal, in response to the processing time counter circuit having counted the first predetermined number of clock cycles since a last reload, to disable the respective stage clock signal.

6. The circuit of claim 3, further comprising:
clock gate circuits respectively connected between the clock control circuits and the circuit processing stages, and operable to start/stop the respective circuit processing stage clock signal based on the circuit processing stage gate clock enable signal.

7. The circuit of claim 1, wherein each of the clock control circuits comprises:
a next stage counter circuit operable to count a predetermined number of clock cycles corresponding with a processing delay of the respective circuit processing stage.

8. The circuit of claim 7, wherein the next stage counter circuit is further operable to:
in response to the respective clock control circuit counting the predetermined number of clock cycles after a clock cycle during which the data in signal that causes the respective stage clock signal to be enabled is received, output a next data in signal to a next of the clock control circuits.

9. The circuit of claim 7, further comprising:
a feedback circuit connected between an output and input of the next stage counter circuit,
wherein in response to the respective stage clock signal being enabled and the next data in signal being output, the feedback circuit is operable to reload the predetermined number of clock cycles of the next stage counter circuit.

10. The circuit of claim 1, wherein the circuit is a Fast Fourier Transform (FFT) processing circuit.

11. The circuit of claim 2, wherein each of the clock control circuits comprises:
a delay circuit operable to delay the received data in signal from being transmitted to a next of the clock control circuits as a data out signal.

12. The circuit of claim 11, wherein the delay circuit comprises:
a chain of one or more flip-flop circuits; and
an OR gate having inputs connected to outputs of the respective flip-flop circuits, and operable to enable the respective stage clock signal based on output signals of the flip-flop circuits.

13. The circuit of claim 11, wherein each of the clock control circuits comprises:
a circuit element connected between the delay circuit and the respective circuit processing stage, and operable to enable power to the respective circuit processing stage while the respective stage clock signal is enabled.

14. The circuit of claim 12, wherein each of the clock control circuits comprises:
a second OR gate operable to enable power to the respective circuit processing stage when the circuit element receives the data in signal, the clock enable signal, or a last of data from a last flip-flip circuit of the chain of one or more flip-flop circuits.

15. The circuit of claim 1, wherein:
the respective circuit processing stages comprise a memory and a logic circuit, and
each of the clock control circuits is operable to enable and disable the respective stage clock signal to one of the memory and at least a portion of the logic circuit.

16. The circuit of claim 15, further comprising a clock gate circuit connected between the clock control circuit and one of the memory and the logic circuit of the respective circuit processing stage.

17. The circuit of claim 1, wherein:
each of the respective circuit processing stages comprises a memory and a logic circuit, and the logic circuit comprises a control logic circuit and a datapath logic circuit, and
the respective clock control circuits are operable to enable and disable the respective stage clock signal to the datapath logic circuit, and continue to clock the memory and the control logic circuit.

18. A method for mitigating load jump in a circuit having circuit processing stages arranged in a pipeline configuration and operable based on respective stage clock signals, and clock control circuits respectively connected to the circuit processing stages to control the respective stage clock signals, the method comprising:
enabling the respective stage clock signal in response to the respective clock control circuit receiving a data in signal representing that the respective circuit processing stage begins to receive valid data for processing;
disabling the respective stage clock signal based on a predetermined respective circuit processing stage processing delay having elapsed since the respective circuit processing stage received any valid data; and
enabling a next of the clock control circuits, which is connected to a next of the circuit processing stages, based on the predetermined respective circuit processing stage processing delay having elapsed since the respective stage clock signal was enabled, indicating that the respective circuit processing stage is beginning to send the processed valid data to the next circuit processing stage.

19. The method of claim 18, where at least two of the circuit processing stages have different processing delays.

20. The method of claim 18, further comprising:
outputting, by each of the clock control circuits, a circuit processing stage gate clock enable signal, in response to receiving the data in signal representing that the respective circuit processing stage begins to receive valid data for processing, to enable the respective stage clock signal.

* * * * *